(12) United States Patent
Shimizu et al.

(10) Patent No.: US 11,665,165 B2
(45) Date of Patent: May 30, 2023

(54) WHITELIST GENERATOR, WHITELIST EVALUATOR, WHITELIST GENERATOR/EVALUATOR, WHITELIST GENERATION METHOD, WHITELIST EVALUATION METHOD, AND WHITELIST GENERATION/EVALUATION METHOD

(71) Applicant: MITSUBISHI ELECTRIC CORPORATION, Tokyo (JP)

(72) Inventors: Koichi Shimizu, Tokyo (JP); Teruyoshi Yamaguchi, Tokyo (JP); Tsunato Nakai, Tokyo (JP); Takeshi Ueda, Tokyo (JP); Nobuhiro Kobayashi, Tokyo (JP); Benoit Boyer, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 842 days.

(21) Appl. No.: 16/464,539

(22) PCT Filed: Jan. 23, 2017

(86) PCT No.: PCT/EP2017/051303
§ 371 (c)(1),
(2) Date: May 28, 2019

(87) PCT Pub. No.: WO2018/077483
PCT Pub. Date: May 3, 2018

(65) Prior Publication Data
US 2021/0112062 A1   Apr. 15, 2021

(51) Int. Cl.
*H04L 9/40* (2022.01)
(52) U.S. Cl.
CPC .................. *H04L 63/101* (2013.01)
(58) Field of Classification Search
CPC ..................................... H04L 63/101
See application file for complete search history.

(56) References Cited

U.S. PATENT DOCUMENTS 8,607,066 B1 * 12/2013 Kailash ............... H04L 63/1441
   713/188
8,950,007 B1 * 2/2015 Teal ....................... H04L 63/101
   726/30

(Continued)

FOREIGN PATENT DOCUMENTS

WO    WO 2016/200644 A1    12/2016

OTHER PUBLICATIONS

Grout et al., "A Simplified Method for Optimising Sequentially Processed Access Control Lists", 2010 Sixth Advanced International Conference On Telecommunications (AICT), IEEE, Piscataway, NJ, USA, May 9, 2010, pp. 347-352, XP031693158.

(Continued)

*Primary Examiner* — Khang Do
(74) *Attorney, Agent, or Firm* — Birch, Stewart, Kolasch & Birch, LLP

(57) ABSTRACT

An object of this invention is to obtain a whitelist generator with which the accuracy of data relating to the specifications of normal communication serving as an automatic generation source can be guaranteed, whereby the accuracy of a generated whitelist can be guaranteed over an entire whitelist generation flow. The whitelist generator is applied to a system formed from a plurality of devices, the plurality of devices being configured to exchange data with each other, in order to generate a whitelist used for whitelisting intrusion detection, and includes a model verification unit that verifies, on the basis of an input model, at least one of whether or not normal communication in the system has been modeled correctly and whether or not the model is logically consistent, and a model conversion unit that converts the verified model into a whitelist.

16 Claims, 15 Drawing Sheets

(56) References Cited

U.S. PATENT DOCUMENTS

| | | | | |
|---|---|---|---|---|
| 9,705,895 B1* | 7/2017 | Gutzmann | | H04L 63/1408 |
| 10,122,591 B1* | 11/2018 | Pack | | H04L 63/101 |
| 2003/0172291 A1* | 9/2003 | Judge | | H04L 63/0236 |
| | | | | 726/1 |
| 2006/0021009 A1 | 1/2006 | Lunt | | |
| 2009/0288152 A1* | 11/2009 | Huber | | G06Q 20/405 |
| | | | | 726/6 |
| 2012/0100834 A1* | 4/2012 | Maeda | | H04W 12/08 |
| | | | | 455/411 |
| 2012/0133579 A1* | 5/2012 | Prieur | | G06F 3/017 |
| | | | | 345/156 |
| 2012/0246612 A1* | 9/2012 | Ji | | G06F 8/35 |
| | | | | 717/104 |
| 2013/0227689 A1* | 8/2013 | Pietrowicz | | H04L 41/12 |
| | | | | 726/23 |
| 2013/0304869 A1* | 11/2013 | Gupta | | G06F 21/554 |
| | | | | 709/219 |
| 2014/0053261 A1* | 2/2014 | Gupta | | H04L 63/1425 |
| | | | | 717/171 |
| 2014/0313975 A1* | 10/2014 | Berenberg | | H04W 76/11 |
| | | | | 370/328 |
| 2015/0172300 A1* | 6/2015 | Cochenour | | G06F 21/6218 |
| | | | | 726/23 |
| 2015/0347480 A1* | 12/2015 | Smart | | G06F 16/26 |
| | | | | 707/743 |
| 2015/0381649 A1* | 12/2015 | Schultz | | G06Q 10/0635 |
| | | | | 726/25 |
| 2016/0094517 A1* | 3/2016 | Kang | | H04L 63/0236 |
| | | | | 726/1 |
| 2016/0094578 A1* | 3/2016 | McQuillan | | H04L 63/1466 |
| | | | | 726/23 |
| 2016/0267209 A1* | 9/2016 | Ikram | | G06F 30/30 |
| 2016/0337390 A1* | 11/2016 | Sridhara | | H04W 12/128 |
| 2017/0039039 A1* | 2/2017 | Johnson | | G06F 11/3608 |
| 2017/0093918 A1* | 3/2017 | Banerjee | | H04L 41/0895 |
| 2017/0099288 A1* | 4/2017 | Kojima | | H04L 63/123 |
| 2017/0329314 A1* | 11/2017 | Shang | | H04L 63/1425 |
| 2017/0374084 A1* | 12/2017 | Inoue | | H04L 63/1433 |
| 2018/0013778 A1* | 1/2018 | Lim | | H04L 63/101 |
| 2019/0190777 A1* | 6/2019 | Uchizumi | | H04L 41/085 |

OTHER PUBLICATIONS

Horowitz et al., "A Hierarchical Model for Firewall Policy Extraction", 2009 International Conference On Advanced Information Networking and Applications, AINA'09. IEEE, Piscataway, NJ, USA, May 26, 2009, pp. 691-698, XP031476168.

International Search Report, issued in PCT/EP2017/051303, dated Dec. 6, 2017.

\* cited by examiner

FIG. 5

| STATE 501 | TRANSMISSION SOURCE 502 | TRANSMISSION DESTINATION 503 | COMMAND 504 |
|---|---|---|---|
| OPERATIVE | IP ADDRESS A | IP ADDRESS B | WRITE |
| OPERATIVE | IP ADDRESS A | IP ADDRESS B | READ 1 |
| OPERATIVE | IP ADDRESS A | IP ADDRESS B | READ 2 |
| OPERATIVE | IP ADDRESS B | IP ADDRESS A | WRITE RESPONSE |
| OPERATIVE | IP ADDRESS B | IP ADDRESS A | READ 1 RESPONSE |
| OPERATIVE | IP ADDRESS B | IP ADDRESS A | READ 2 RESPONSE |

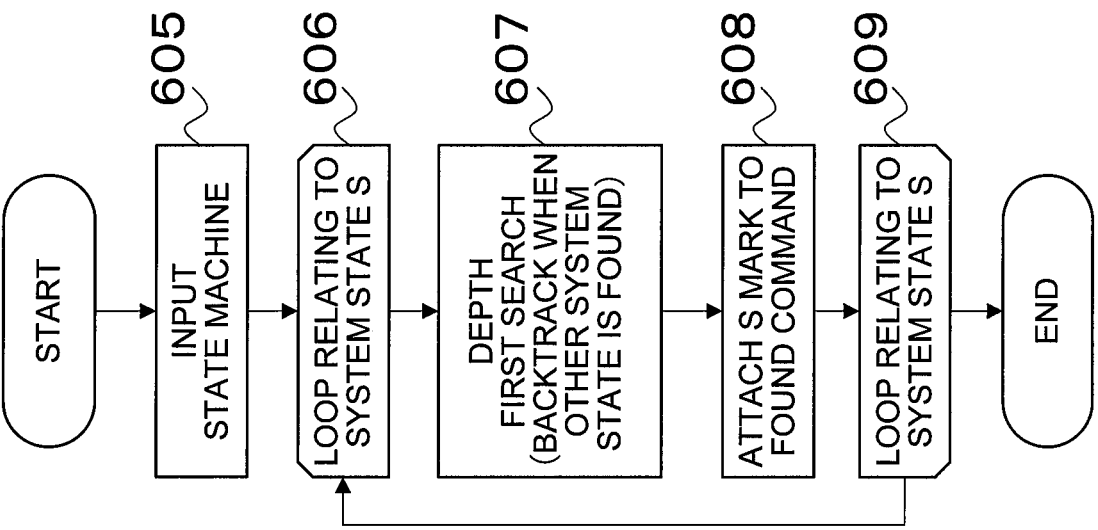
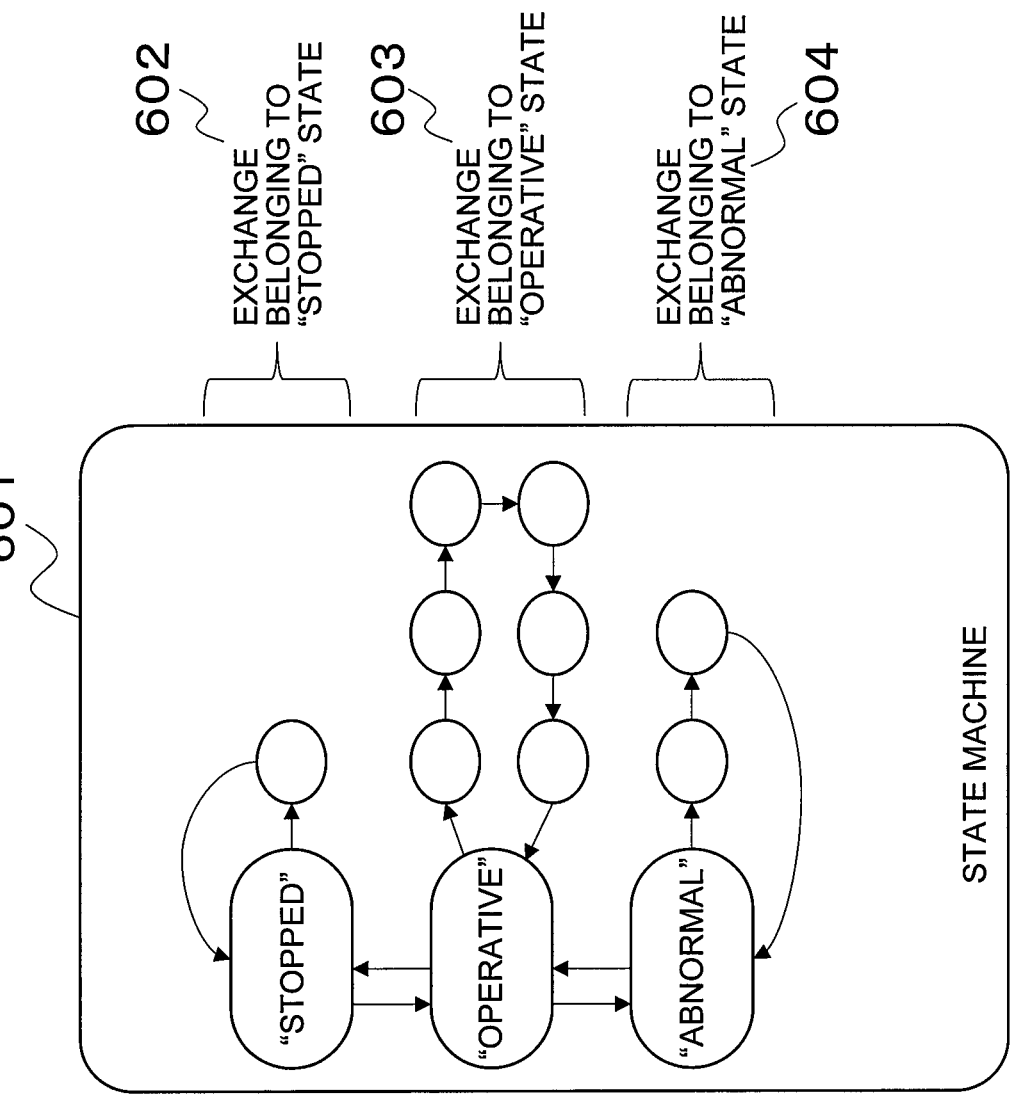

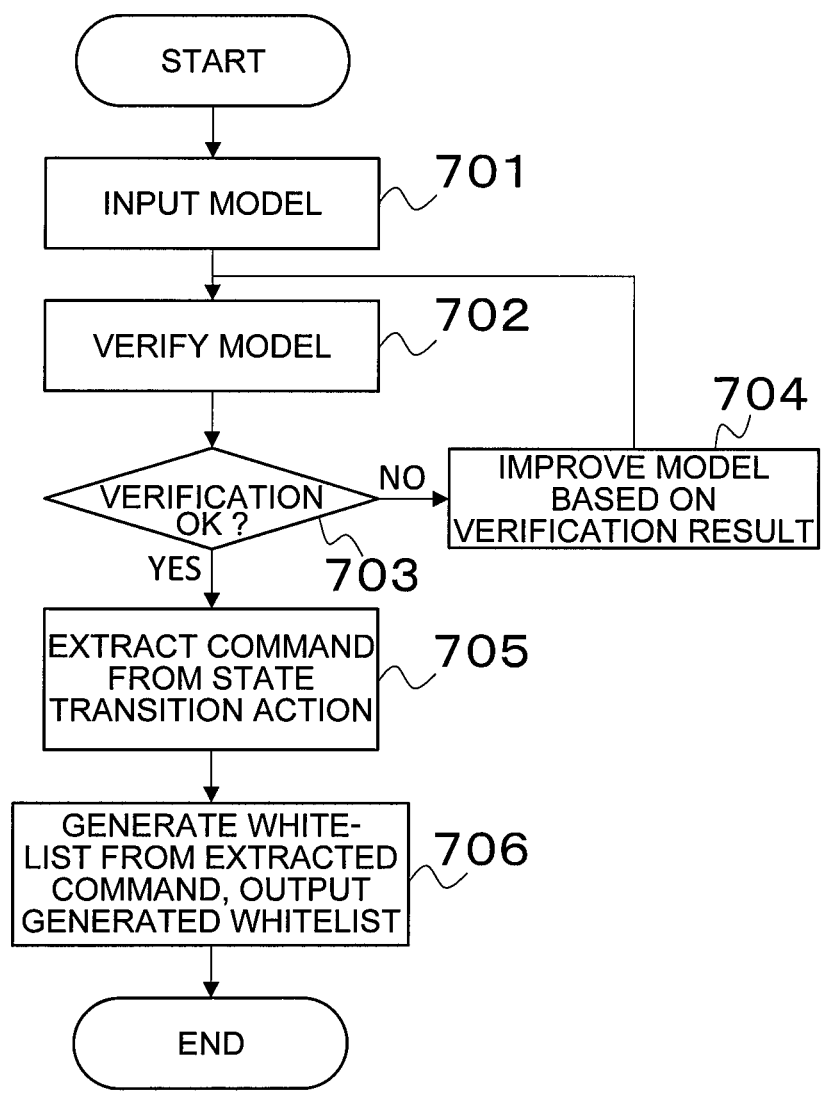

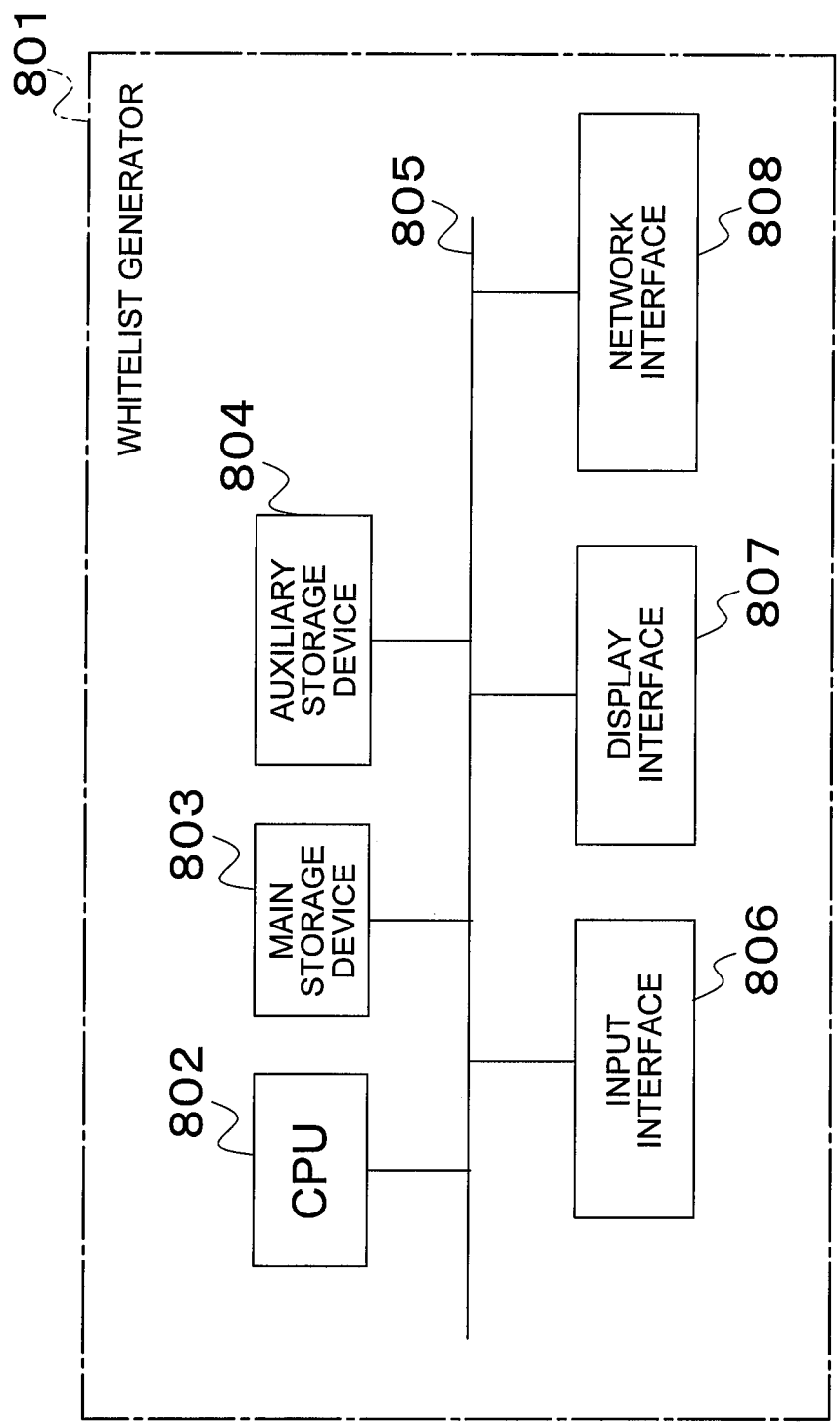

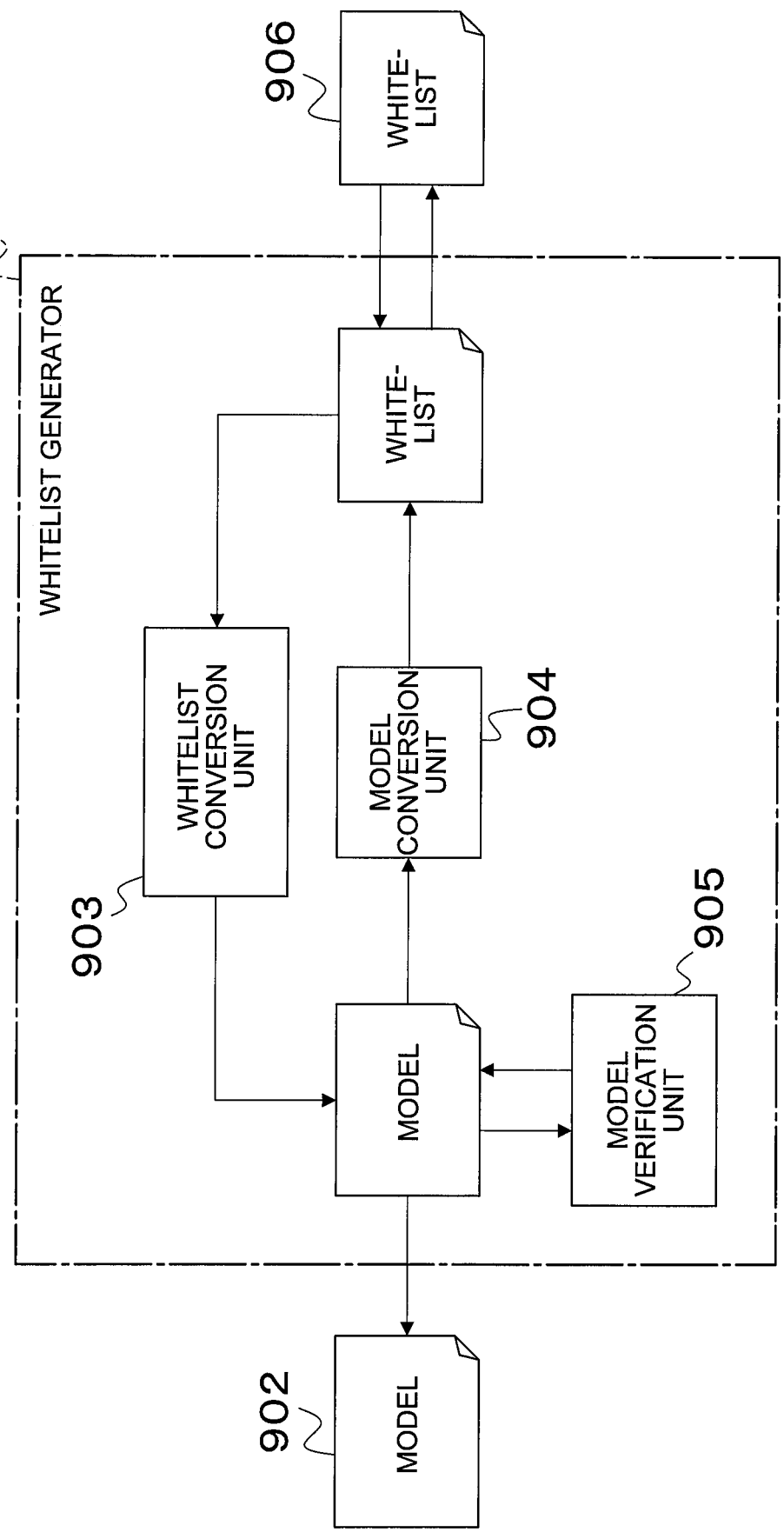

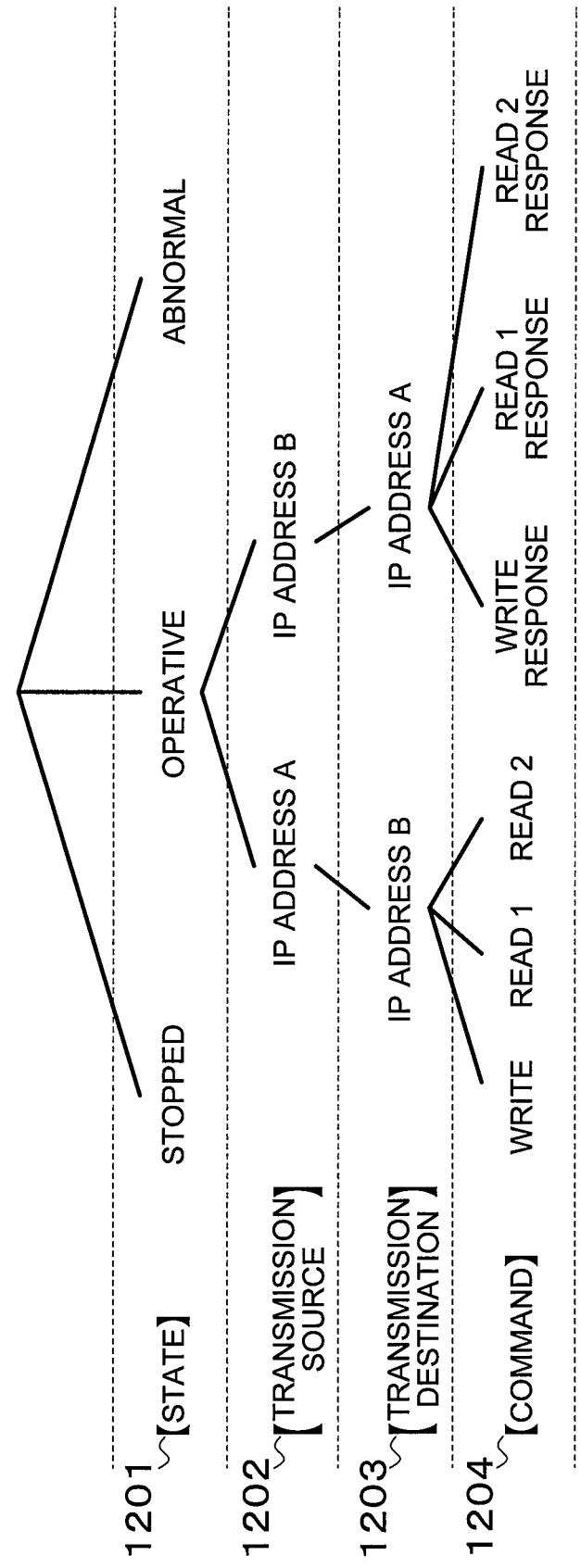

FIG. 13

STATE OF SYSTEM — 1301

| STATE |
|---|
| OPERATIVE |

DETERMINATION SUBJECT PACKET — 1302

| TRANSMISSION SOURCE | TRANSMISSION DESTINATION | COMMAND |
|---|---|---|
| IP ADDRESS A | IP ADDRESS B | READ 2 |

TREE SEARCH PROGRAM + WHITELIST — 1307

[STATE] STOPPED / OPERATIVE — 1303
ABNORMAL

[TRANSMISSION SOURCE] IP ADDRESS A 1304 / IP ADDRESS B

[TRANSMISSION DESTINATION] IP ADDRESS B 1305 / IP ADDRESS A

[COMMAND] WRITE / READ 1 / READ 2 — 1306 / WRITE RESPONSE / READ 1 RESPONSE / READ 2 RESPONSE

WHITELIST GENERATOR, WHITELIST EVALUATOR, WHITELIST GENERATOR/EVALUATOR, WHITELIST GENERATION METHOD, WHITELIST EVALUATION METHOD, AND WHITELIST GENERATION/EVALUATION METHOD

TECHNICAL FIELD

This invention relates to a whitelist generator, a whitelist evaluator, a whitelist generator/evaluator, a whitelist generation method, a whitelist evaluation method, and a whitelist generation/evaluation method for appropriate whitelisting intrusion detection in a system having a fixed operation mode, such as an industrial control system.

BACKGROUND ART

Recent years have witnessed increases in the number of cyber-attacks on industrial control systems, leading to demand for countermeasures. A whitelisting intrusion detection technique is available as a technique for preventing cyber-attacks from a network. In this technique, packets having communication permission are defined in advance on a list known as a whitelist, and when a packet not on the whitelist is received, the packet is detected as an attack.

In comparison with a typical information system, an industrial control system has a fixed operation mode in which fixed packets are transmitted and received. It is therefore considered possible to define packets having communication position in advance on a whitelist. As a result, high expectations have been placed on the whitelisting intrusion detection technique as a countermeasure against cyber-attacks on industrial control systems.

Problems encountered in whitelisting intrusion detection include the cost of generating the whitelist and the precision of the whitelist. Therefore, demand exists for a technique with which the cost of generating the whitelist can be reduced and an accurate whitelist can be generated. Here, automatic generation may be employed as a technique for reducing the cost of generating the whitelist.

A method of modeling a periodic communication pattern as a deterministic finite automaton and setting the resulting model as a whitelist has been proposed as a technique for automatically generating a whitelist (see, NPL 1, for example). The model is generated automatically using a sample of approximately 100 packets, and therefore the cost of generating the whitelist can be kept low.

In another method proposed as a technique for automatically generating a whitelist, which is employed in a control system for an electrical substation defined by IEC 61850, a whitelist is generated automatically on the basis of a file having a format known as SCD (Substation Configuration Description), in which specifications of the system are described (see NPL 2, for example).

SCD is a fixed file format, and therefore data relating to a communication pattern can be extracted therefrom automatically. As a result, a whitelist can be generated automatically. Furthermore, by automating whitelist generation, the cost of generating the whitelist can be reduced. At the same time, errors are less likely to occur than when the whitelist is generated manually, and therefore the accuracy of the whitelist can be improved.

CITATION LIST

Non Patent Literature

[NPL 1] Goldenberg et al, "Accurate Modeling of Modbus/TCP for Intrusion Detection in SCADA Systems", International Journal of Critical Infrastructure Protection, vol. 6, no. 2, 2013

[NPL 2] Hadeli et al, "Leveraging Determinism in Industrial Control Systems for Advanced Anomaly Detection and Reliable Security Configuration", IEEE ETFA 2009, 2009

SUMMARY OF INVENTION

Technical Problem

However, in NPL 1, the whitelist is generated on the basis of observed packets, and therefore the completeness of the observed packets is open to question. Moreover, an attack packet may intrude during the observation period.

Further, in NPL 2, an error may occur during creation of the SCD file serving as an automatic generation source, and as a result, the whitelist may be defined erroneously. Moreover, an installed intrusion detection program is not guaranteed to perform detection in accordance with the definition of the whitelist.

This invention has been designed to solve the problems described above, and an object thereof is to obtain a whitelist generator, a whitelist evaluator, a whitelist generator/evaluator, a whitelist generation method, a whitelist evaluation method, and a whitelist generation/evaluation method with which the accuracy of data relating to the specifications of normal communication serving as an automatic generation source can be guaranteed, whereby the accuracy of a generated whitelist can be guaranteed over an entire whitelist generation flow.

Solution to Problem

A whitelist generator according to this invention is applied to a system formed from a plurality of devices, the plurality of devices being configured to exchange data with each other, in order to generate a whitelist used for whitelisting intrusion detection, and includes a model verification unit that verifies, on the basis of an input model, at least one of whether or not normal communication in the system has been modeled correctly and whether or not the model is logically consistent, and a model conversion unit that converts the verified model into a whitelist.

The whitelist generator according to this invention is applied to a system formed from a plurality of devices, the plurality of devices being configured to exchange data with each other, in order to generate a whitelist used for whitelisting intrusion detection, and includes the model verification unit that verifies, on the basis of an input model at least one of whether or not normal communication in the system has been modeled correctly and whether or not the model is logically consistent, and the model conversion unit that converts the verified model into a whitelist.

Accordingly, the accuracy of data relating to the specifications of normal communication serving as an automatic generation source can be guaranteed, and as a result, the accuracy of the generated whitelist can be guaranteed over an entire whitelist generation flow.

BRIEF DESCRIPTION OF DRAWINGS

FIG. 5 is an illustrative view showing a specific example of a whitelist corresponding to a model of normal communication described in FIG. 4.

FIG. 6A is an illustrative view showing an operation executed by the whitelist generator according to the first embodiment of this invention to generate a whitelist on the basis of a state of the system.

FIG. 6B is a flowchart showing the operation executed by the whitelist generator according to the first embodiment of this invention to generate a whitelist on the basis of the state of the system.

FIG. 7 is a flowchart showing an operation of the whitelist generator according to the first embodiment of this invention.

FIG. 8 is a view showing a hardware configuration of the whitelist generator according to the first embodiment of this invention.

FIG. 9 is a block diagram showing a configuration of a whitelist generator according to a second embodiment of this invention.

FIG. 12 is an illustrative view showing the whitelist of FIG. 5 as a tree structure.

FIG. 13 is an illustrative view showing an operation performed on a determination subject packet by a detection program of the whitelist evaluator according to the third embodiment of this invention.

DESCRIPTION OF EMBODIMENTS

Figure 1:
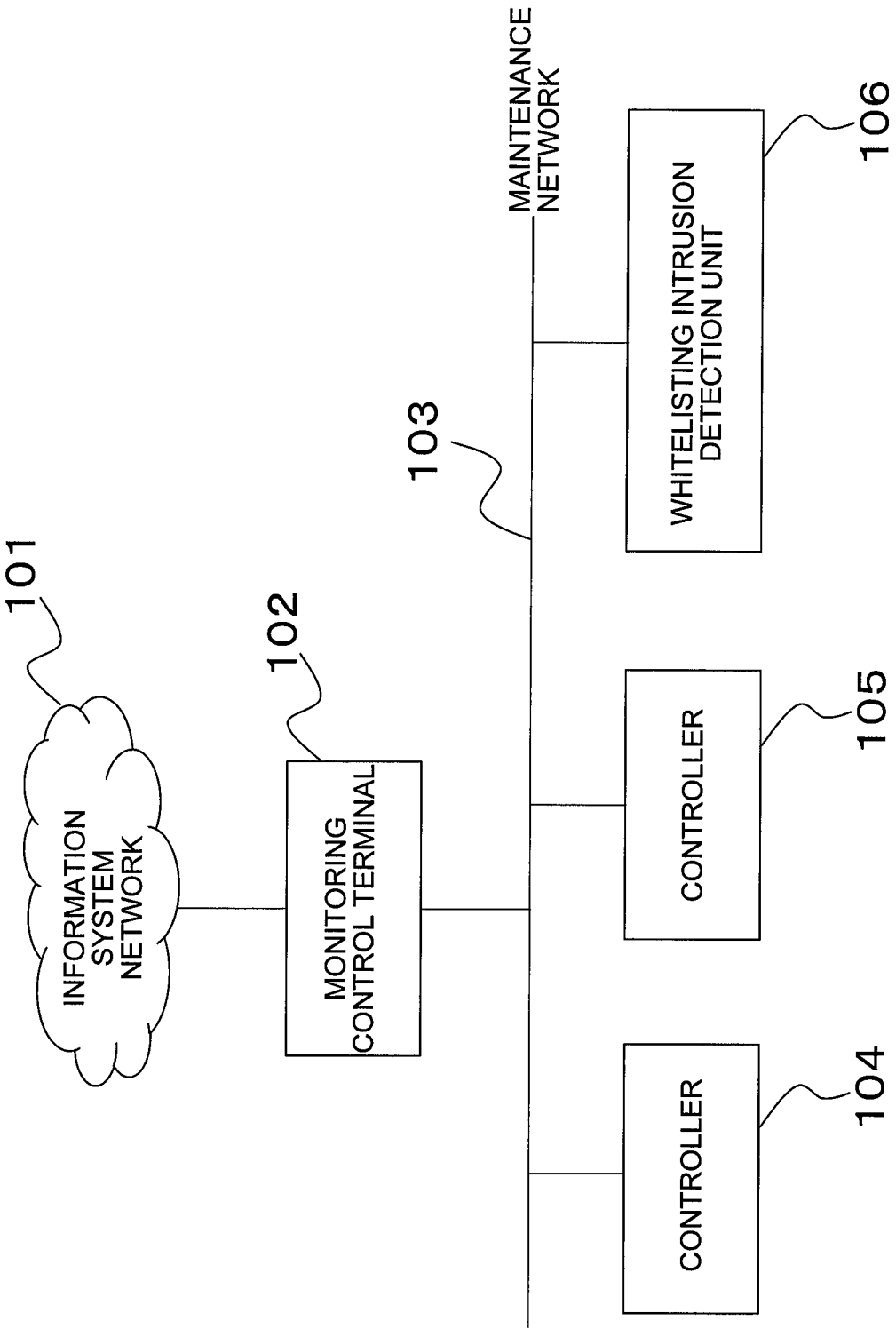
FIG. 1 is a block diagram showing a configuration of an industrial control system to which this invention is applied.

Preferred embodiments of a whitelist generator, a whitelist evaluator, and a whitelist generator/evaluator according to this invention will be described below using the drawings. Identical or corresponding parts of the respective drawings will be described using identical reference numerals.

First Embodiment

FIG. 1 is a block diagram showing a configuration of an industrial control system to which this invention is applied. In this industrial control system, as shown in FIG. 1, a monitoring control terminal 102 is connected to a controller 104 and a controller 105 via a maintenance network 103 such that the monitoring control terminal 102 performs monitoring control on the controller 104 and the controller 105 via the maintenance network 103.

Further, the monitoring control terminal 102 is connected to an information system network 101 so that information gathered from the controller 104 and the controller 105 can be transmitted to a server or the like, not shown in the drawing, connected to the information system network 101.

Furthermore, a whitelisting intrusion detection unit 106 is connected to the maintenance network 103 to be capable of detecting an intrusion with respect to communication packets that are transmitted and received over the maintenance network 103. Here, a rule by which the whitelisting intrusion detection unit 106 detects an intrusion, or in other words a whitelist, must be generated.

Figure 2:
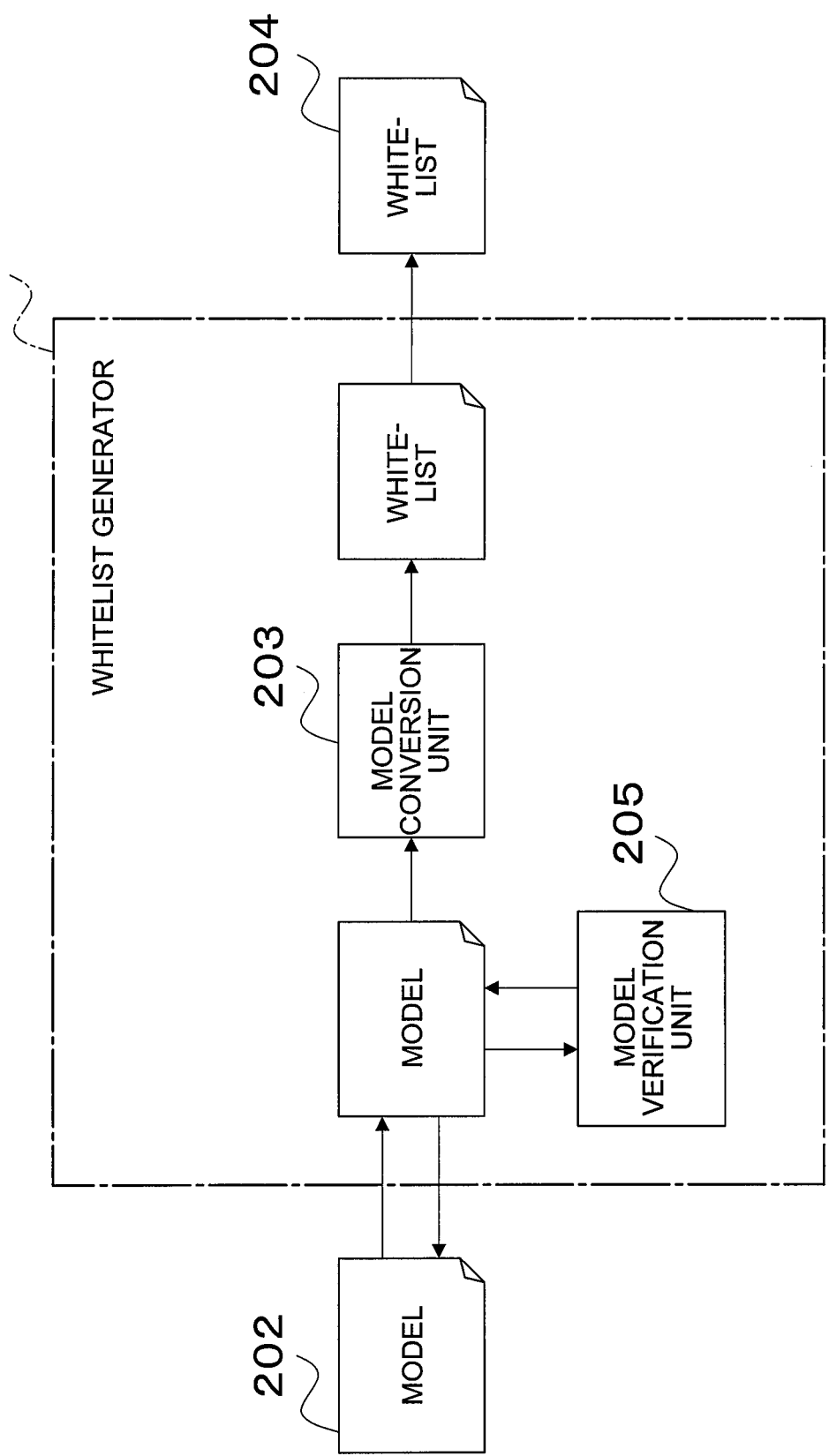
FIG. 2 is a block diagram showing a configuration of a whitelist generator according to a first embodiment of this invention.

FIG. 2 is a block diagram showing a configuration of a whitelist generator according to a first embodiment of this invention. In FIG. 2, a whitelist generator 201 receives a model 202 as input, and outputs a whitelist 204. Further, the whitelist generator 201 includes a model conversion unit 203 and a model verification unit 205.

The model conversion unit 203 converts the input model 202 into a whitelist, and outputs the whitelist. The model verification unit 205 verifies the input model 202, and improves the model 202 as required by feeding back the verification result. The model verification unit 205 is also capable of outputting the improved model 202.

Figure 3:
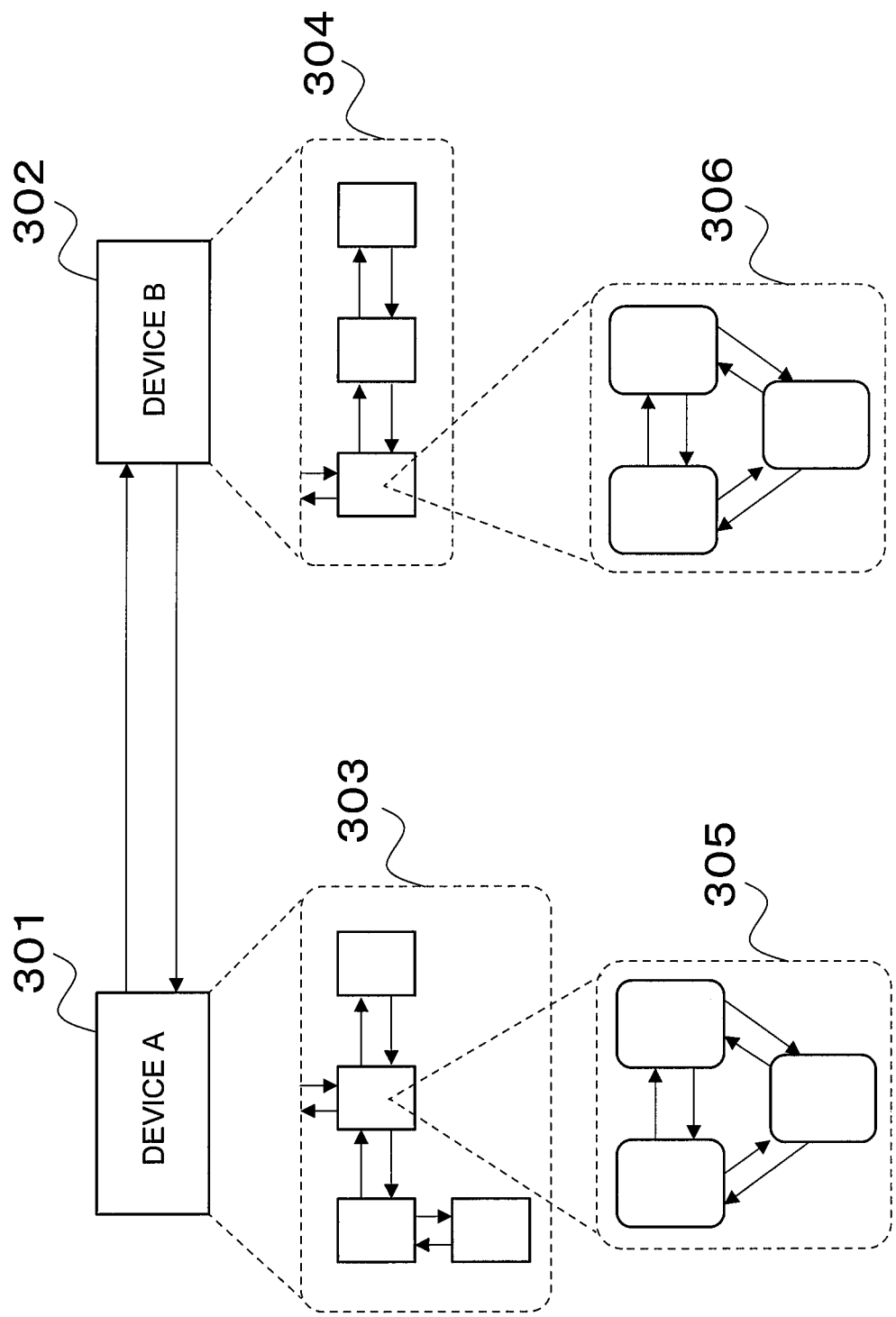
FIG. 3 is a schematic view showing a model that is input into the whitelist generator according to the first embodiment of this invention.

FIG. 3 is a schematic view showing the model that is input into the whitelist generator according to the first embodiment of this invention. FIG. 3 shows a model of an industrial control system such as that of FIG. 1, wherein a device A301 and a device B302 correspond respectively to the monitoring control terminal 102 and the controller 104, for example.

The device A301 and the device B302 are connected to each other communicably such that a command is transmitted from the device A301 to the device B302, processing corresponding to the command is performed by the device B302, and a result of the processing performed on the command is transmitted to the device A301 from the device B302, for example.

Control logic 303 and control logic 304 are defined in relation to the device A301 and the device B302, respectively, by blocks shown in the drawing. Further, a state machine 305 and a state machine 306 that define communication operations are included respectively in the control logic 303 and the control logic 304, as shown in the drawing, whereby normal communication in the industrial control system is modeled.

In this invention, processing is performed on the normal communication model illustrated by the state machine 305 and the state machine 306, but not performed on the control logic 303 and the control logic 304. Further, a state machine may be referred to as a model hereafter.

Figure 4:
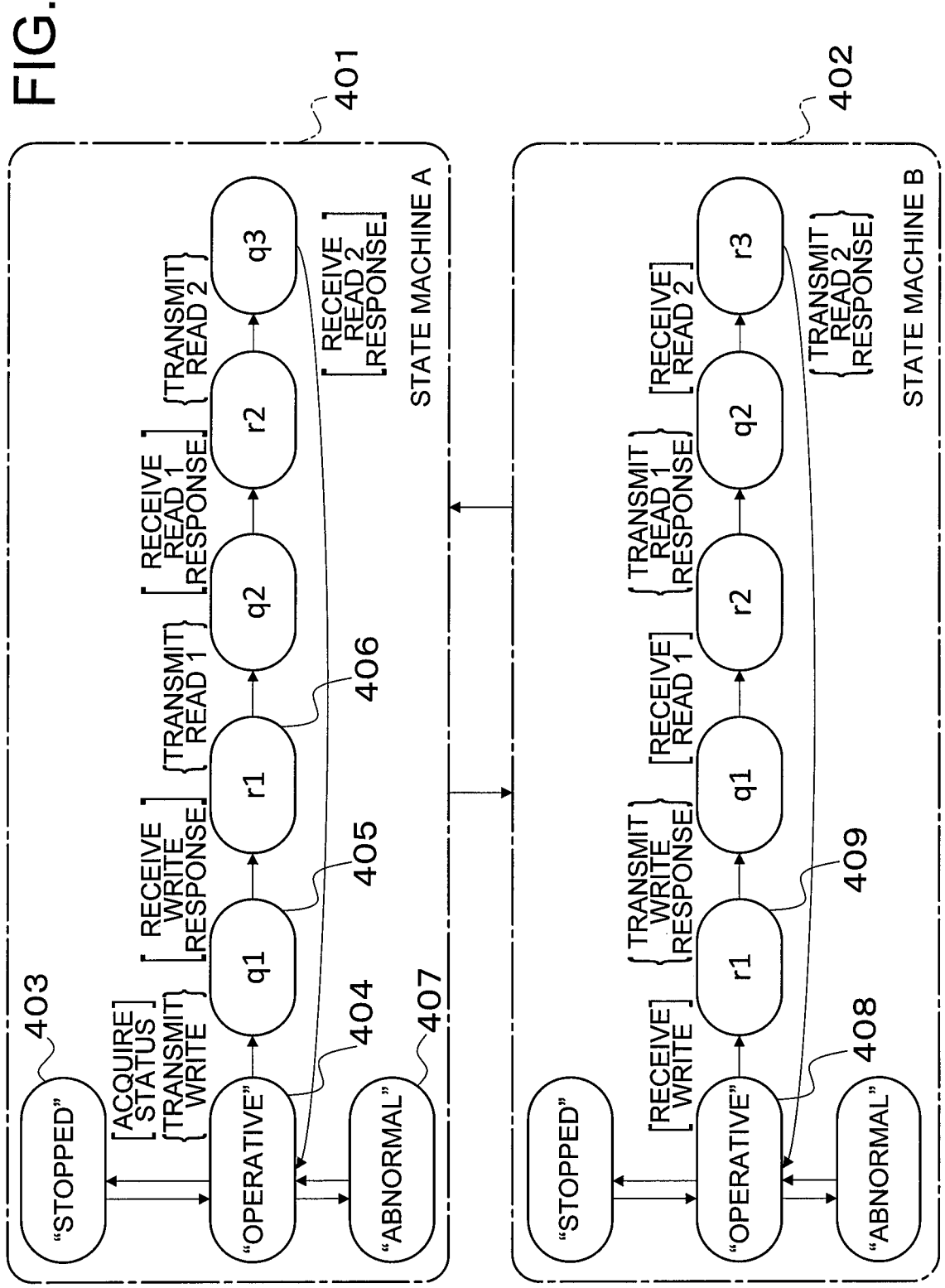
FIG. 4 is an illustrative view showing a specific example of a state machine of the whitelist generator according to the first embodiment of this invention.

FIG. 4 is an illustrative view showing a specific example of a state machine of the whitelist generator according to the first embodiment of this invention. In FIG. 4, a state machine 401 corresponds to the device A301, and a state machine 402 corresponds to the device B302. Further, the state machine 401 and the state machine 402 are connected to each other so as to be capable of exchanging data.

States constituting the state machine 401 include states representing the state of the system, such as a state 403, and states representing a data exchange state, such as a state 405. In FIG. 4, the states representing the state of the system are expressed using double quotation marks, and the states representing the data exchange state are expressed without double quotation marks. As long as the two types of state can be differentiated, however, any type of notation may be used.

In FIG. 4, the system may be in any one of three states, namely "Stopped", "Operative", and "Abnormal", as indicated by a state 403, a state 404, and a state 407. When the system is stopped, the system is in the "Stopped" state 403, and when the system starts to operate, the system shifts to the "Operative" state 404. Further, when an abnormality occurs in the system, the system shifts to the "Abnormal" state 407.

Normally, the system waits in the "Operative" state 404, shifts to a state 405 in response to a certain trigger, whereupon data exchange begins, and returns to the "Operative" state 404 when a series of data exchange operations is completed. The trigger corresponds to a GUI operation or the like performed on an operating panel of the monitoring control terminal 102 shown in FIG. 1 in order to obtain a status of the controller 104, for example.

In FIG. 4, a command is transmitted from the state machine 401 and received by the state machine 402 as follows. In FIG. 4, conditions serving as triggers for a state transition are shown in square brackets, and actions generated during state transitions are shown in curly brackets.

At first, the state machine 401 and the state machine 402 both wait in the "Operative" state. Here, when "Acquire status", which serves as a trigger, is satisfied in the state machine 401, the state machine 401 shifts from the state 404 to the state 405. When "Transmit write", which is described as the action of the state transition, is executed at this time, a "Write" command is transmitted to the state machine 402.

Next, the state machine 402 receives the "Write" command transmitted by the state machine 401, whereby "Receive write", which is described as a trigger, is satisfied. As a result, the state machine 402 shifts from a state 408 to a state 409. When "Transmit write response", which is described as the action of the state transition, is executed at this time, a "Write response" command is transmitted from the state machine 402 to the state machine 401.

Next, the state machine 401 receives the "Write response" command transmitted by the state machine 402, whereby "Receive write response", which is described as a trigger, is satisfied. As a result, the state machine 401 shifts from the state 405 to a state 406. Thereafter, commands and responses thereto are exchanged in a similar manner repeatedly between the state machine 401 the state machine 402 until the respective state machines 401, 402 finally return to the state 404 and the state 408.

FIG. 5 is an illustrative view showing a specific example of a whitelist corresponding to the model of normal communication described in FIG. 4. In FIG. 5, the whitelist is constituted by four fields, namely a state 501, a transmission source 502, a transmission destination 503, and a command 504.

Here, the state 501 is determined in accordance with the state of the system in FIG. 4. Further, the transmission source 502 and the transmission destination 503 are determined respectively in accordance with the transmission source and the transmission destination of the data exchange operations in FIG. 4. Furthermore, the command 504 is determined in accordance with the command that is transmitted as the action in FIG. 4.

Note that although the specific examples shown in FIGS. 4 and 5 correspond to a whitelist constituted by four fields, namely the state, the transmission source, the transmission destination, and the command, the whitelist may be constituted by other fields.

Next, operations of the model conversion unit 203 and the model verification unit 205 of the whitelist generator 201 shown in FIG. 2 will be described. The model conversion unit 203 converts a state machine into a whitelist in accordance with the correspondence relationships between FIGS. 4 and 5. The model verification unit 205 verifies the model using a model simulation typically executed during model base development or a method known as a formal method, in which the accuracy of the model is verified mathematically.

Next, an operation for generating a whitelist on the basis of the state of the system will be described. FIG. 6A is an illustrative view showing an operation executed by the whitelist generator according to the first embodiment of this invention to generate a whitelist on the basis of the state of the system.

In FIG. 6A, as illustrated schematically in a state machine 601, the exchanged command varies according to the state of the system, and therefore the allowed commands vary.

Accordingly, a whitelist based on the state of the system is generated by classifying command exchanges described in the state machine into respective system states, as indicated by command exchanges 602, 603, 604, and extracting an allowed command in each system state on the basis of the classifications.

FIG. 6B is a flowchart showing the operation executed by the whitelist generator according to the first embodiment of this invention to generate a whitelist on the basis of the state of the system. In FIG. 6B, first, a state machine is input (step S605).

Next, loop processing is performed in relation to each system state S (steps S606 to S609). First, a depth first search is performed using the system state S as a root (step S607).

In a typical depth first search, the search is backtracked when a searched node is found, but in step S607, the search is also backtracked when a system state other than the system state S is found.

Next, an S mark is attached to a command found during the search (step S608). In so doing, the command is denoted as an allowed command in the system state S. As a result, a whitelist is generated on the basis of the state of the system.

FIG. 7 is a flowchart showing an operation of the whitelist generator according to the first embodiment of this invention. In FIG. 7, first, a model is input (step S701). Next, the model is verified (step S702).

Next, a determination is made as to whether or not the model verification result is favorable (step S703). When it is determined here that the model verification result is not favorable (i.e. Yes), the model is improved on the basis of the verification result (step S704), whereupon the routine returns to step S703 and the model is verified again.

When it is determined in step S703 that the model verification result is favorable (i.e. No), on the other hand, a description of command transmission is extracted from the description of the state transition action included in the model (step S705). Next, a rule for allowing the command extracted in step S705 is created and output as the whitelist (step S706), whereupon the processing of FIG. 7 is terminated.

FIG. 8 is a view showing a hardware configuration of the whitelist generator according to the first embodiment of this invention. In FIG. 8, a whitelist generator 801 is constituted by a CPU 802, a main storage device 803, an auxiliary storage device 804, an input interface 806, a display interface 807, and a network interface 808, these components being connected to each other by a bus 805.

The model 202 input into the whitelist generator 201 shown in FIG. 2 and the whitelist 204 output therefrom are stored in the auxiliary storage device 804, transferred to the main storage device 803 as required, and processed by the CPU 802, for example. Further, the processing of the model conversion unit 203 and the model verification unit 205 of the whitelist generator 201 shown in FIG. 2 is executed by the CPU 802.

By representing normal communication in the system using a verifiable model, guaranteeing the accuracy of the model by means of verification, and generating a whitelist automatically from the accuracy-guaranteed model in this manner, costs required to generate a whitelist manually can be eliminated, errors occurring when a whitelist is generated manually can be avoided, and the accuracy of the whitelist can be improved.

Hence, the whitelist generator according to the first embodiment is applied to a system formed from a plurality of devices, the plurality of devices being configured to exchange data with each other, in order to generate a whitelist used for whitelisting intrusion detection, and includes a model verification unit that verifies, on the basis of an input model, at least one of whether or not normal communication in the system has been modeled correctly and whether or not the model is logically consistent, and a model conversion unit that converts the verified model into a whitelist.

Accordingly, the accuracy of the data relating to the specifications of the normal communication that serves as an automatic generation source can be guaranteed, and as a result, the accuracy of the generated whitelist can be guaranteed over an entire whitelist generation flow.

Second Embodiment

In the first embodiment, a method of converting a model into a whitelist from the correspondence relationship between the state machine shown in FIG. 4 and the whitelist shown in FIG. 5 was described, but conversely, a whitelist may be converted into a model.

FIG. 9 is a block diagram showing a configuration of a whitelist generator according to a second embodiment of this invention. In FIG. 9, a whitelist generator 901 receives a whitelist 906 as input, and outputs a model 902. Further, the whitelist generator 901 includes a whitelist conversion unit (a first whitelist conversion unit) 903, a model conversion unit 904, and a model verification unit 905.

The whitelist conversion unit 903 converts the input whitelist 906 into a model, and outputs the model. The model verification unit 905 verifies the converted model, improves the model as required by feeding back the verification result, and outputs the result as the model 902. Further, the model conversion unit 904 converts the improved model into a whitelist, and outputs the result as the improved whitelist 906.

Figure 10:
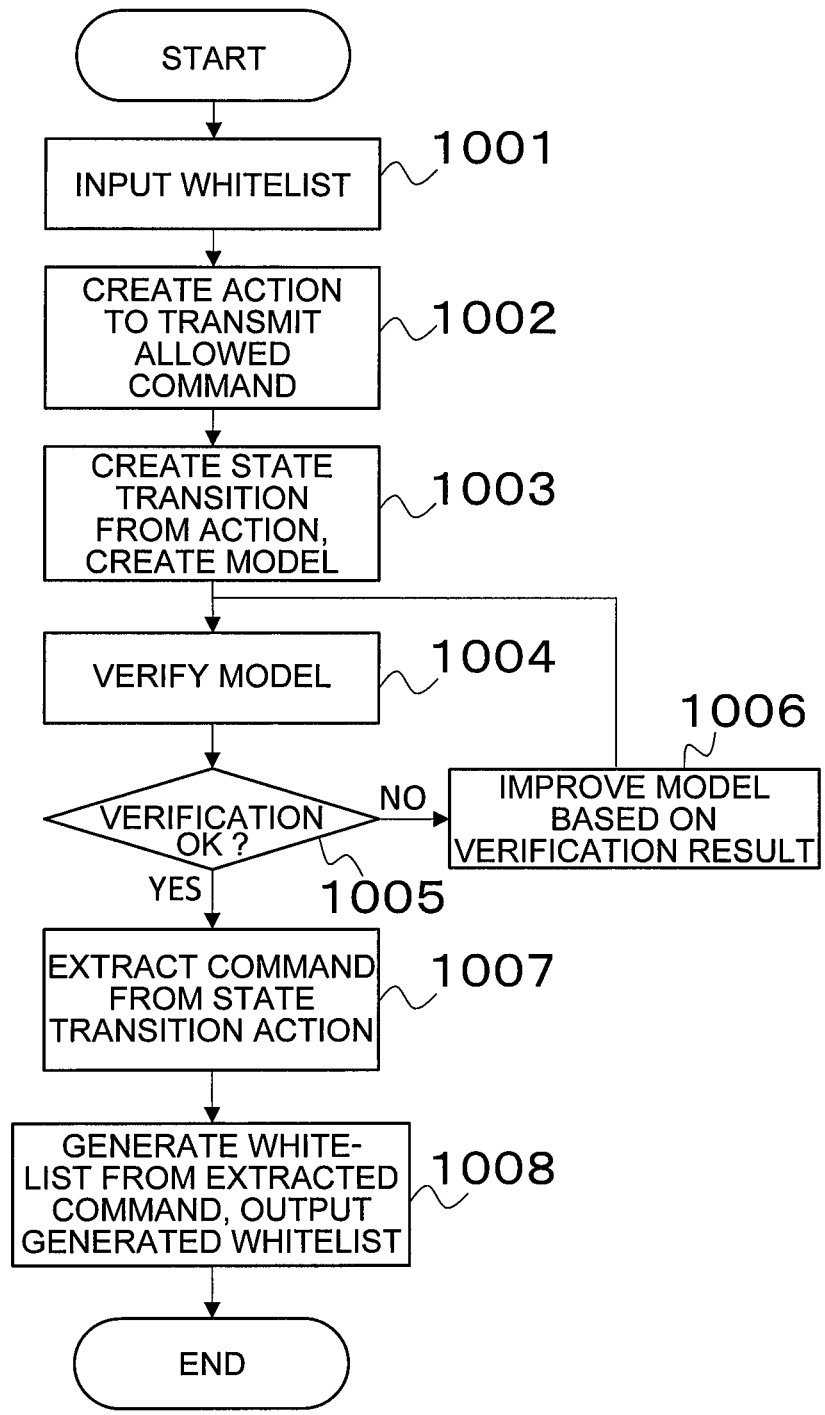
FIG. 10 is a flowchart showing an operation of the whitelist generator according to the second embodiment of this invention.

FIG. 10 is a flowchart showing an operation of the whitelist generator according to the second embodiment of this invention. In FIG. 10, first, a whitelist is input (step S1001).

Next, an action representing transmission of an allowed command on the whitelist is created (step S1002). Next, a state transition that includes the action is created, whereupon a model that includes the state transition is created (step S1003).

Next, the model is verified (step S1004). Next, a determination is made as to whether or not the model verification result is favorable (step S1005). When it is determined here that the model verification result is not favorable (i.e. Yes), the model is improved on the basis of the verification result (step S1006), whereupon the routine returns to step S1004 and the model is verified again.

When it is determined in step S1005 that the model verification result is favorable (i.e. No), on the other hand, a description of command transmission is extracted from the description of the state transition action included in the model (step S1007). Next, a rule for allowing the command extracted in step S1007 is created and output as the whitelist (step S1008), whereupon the processing of FIG. 10 is terminated.

By converting a whitelist into a verifiable model, verifying the model in order to detect errors therein, correcting the errors, and then converting the model back into a whitelist in this manner, the accuracy of an existing whitelist can be improved.

Third Embodiment

In the first and second embodiments, cases in which an industrial control system serving as an application subject is modeled and a whitelist is generated from modeled normal communication were described.

In addition, the performance of the generated whitelist may be evaluated, and the whitelist may be improved on the basis of the evaluation result. Hence, in a third embodiment of this invention, a case in which the performance of the whitelist is evaluated and improved using an actual packet or packet dump data will be described.

Figure 11:
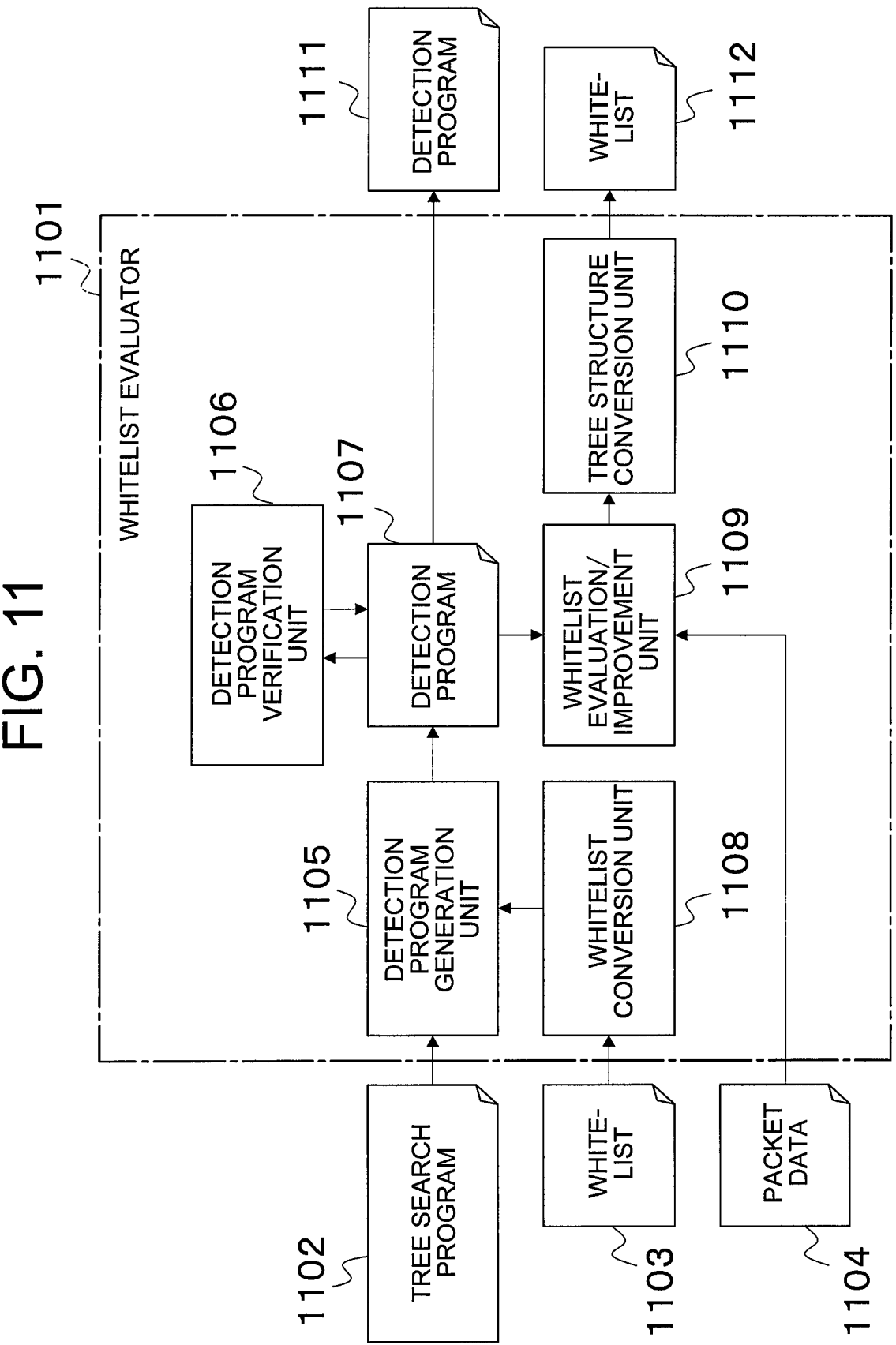
FIG. 11 is a block diagram showing a configuration of a whitelist evaluator according to a third embodiment of this invention.

FIG. 11 is a block diagram showing a configuration of a whitelist evaluator according to the third embodiment of this invention. In FIG. 11, a whitelist evaluator 1101 receives a tree search program 1102, a whitelist 1103, and packet data 1104 as input, and outputs a detection program 1111 and a whitelist 1112.

Further, the whitelist evaluator 1101 includes a detection program generation unit 1105, a detection program verification unit 1106, a whitelist conversion unit (a second whitelist conversion unit) 1108, a whitelist evaluation/improvement unit 1109, and a tree structure conversion unit 1110. Furthermore, a detection program 1107 generated by the detection program generation unit 1105 is stored in the main storage device or the like.

The whitelist conversion unit 1108 converts the whitelist 1103, which is input in a list format, into a tree structure, and outputs the converted whitelist 1103 to the detection program generation unit 1105. The tree search program 1102 is also input into the detection program generation unit 1105. The detection program generation unit 1105 generates a whitelist detection program by integrating the whitelist 1103 and the tree search program 1102.

The detection program verification unit 1106 verifies the generated detection program 1107, improves the detection program as required by feeding back the verification result, and outputs the detection program as the improved detection program 1111.

The whitelist evaluation/improvement unit 1109 receives the detection program 1107 and the packet data 1104, evaluates the performance of the whitelist, improves the whitelist as required, and outputs the improved whitelist to the tree structure conversion unit 1110. Note that at this stage, the whitelist has a tree structure, and is therefore converted back into its original format by the tree structure conversion unit 1110 and output as the whitelist 1112.

Operations of the detection program generation unit 1105, the detection program verification unit 1106, the whitelist conversion unit 1108, and the tree structure conversion unit 1110 shown in FIG. 11 will now be described with reference to FIGS. 12 to 14.

FIG. 12 is an illustrative view showing the whitelist of FIG. 5 as a tree structure. In FIG. 12, the tree structure is created such that branches bifurcate therefrom in accordance with the respective fields of the whitelist.

First, three branches, namely "Stopped", "Operative", and "Abnormal", bifurcate from the root in accordance with a "State" field 1201. Next, branches bifurcate in accordance with a "Transmission source" field 1202. On the whitelist shown in FIG. 5, when the "State" is "Operative", the "Transmission source" takes one of two values, namely "IP address A" and "IP address B", and therefore two branches, namely "IP address A" and "IP address B", bifurcate below "Operative" on the tree structure shown in FIG. 12.

Thereafter, branches bifurcate similarly from a "Transmission destination" field 1203 and a "Command" field 1204, whereby the whitelist is created. By performing this operation, the whitelist conversion unit 1108 is realized, and by performing a reverse operation, the tree structure conversion unit 1110 is realized.

Further, by searching for the whitelist tree generated in the manner described above using the tree search program, the whitelist detection program is realized. Hence, by integrating the tree search program with the whitelist tree, a detection program is generated. As a result, the detection program generation unit 1105 shown in FIG. 11 is realized.

FIG. 13 is an illustrative view showing an operation performed on a determination subject packet by the detection program of the whitelist evaluator according to the third embodiment of this invention. FIG. 13 shows a current system state 1301, a determination subject packet 1302, and a detection program 1307. As indicated by the detection program 1307, the program is obtained by integrating a tree search program and a whitelist having a tree structure.

In FIG. 13, when the packet 1302 is input into the detection program 1307, the current system state 1301 is "Operative", and therefore, first, a branch 1303 is selected during a tree search performed on the whitelist.

Next, the "Transmission source" of the packet 1302 is "IP address A", and therefore a branch 1304 is selected. Thereafter, a branch 1305 and a branch 1306 are selected similarly in sequence, whereby the tree search is completed successfully. When the tree search is completed successfully, the packet is allowed.

Figure 14:
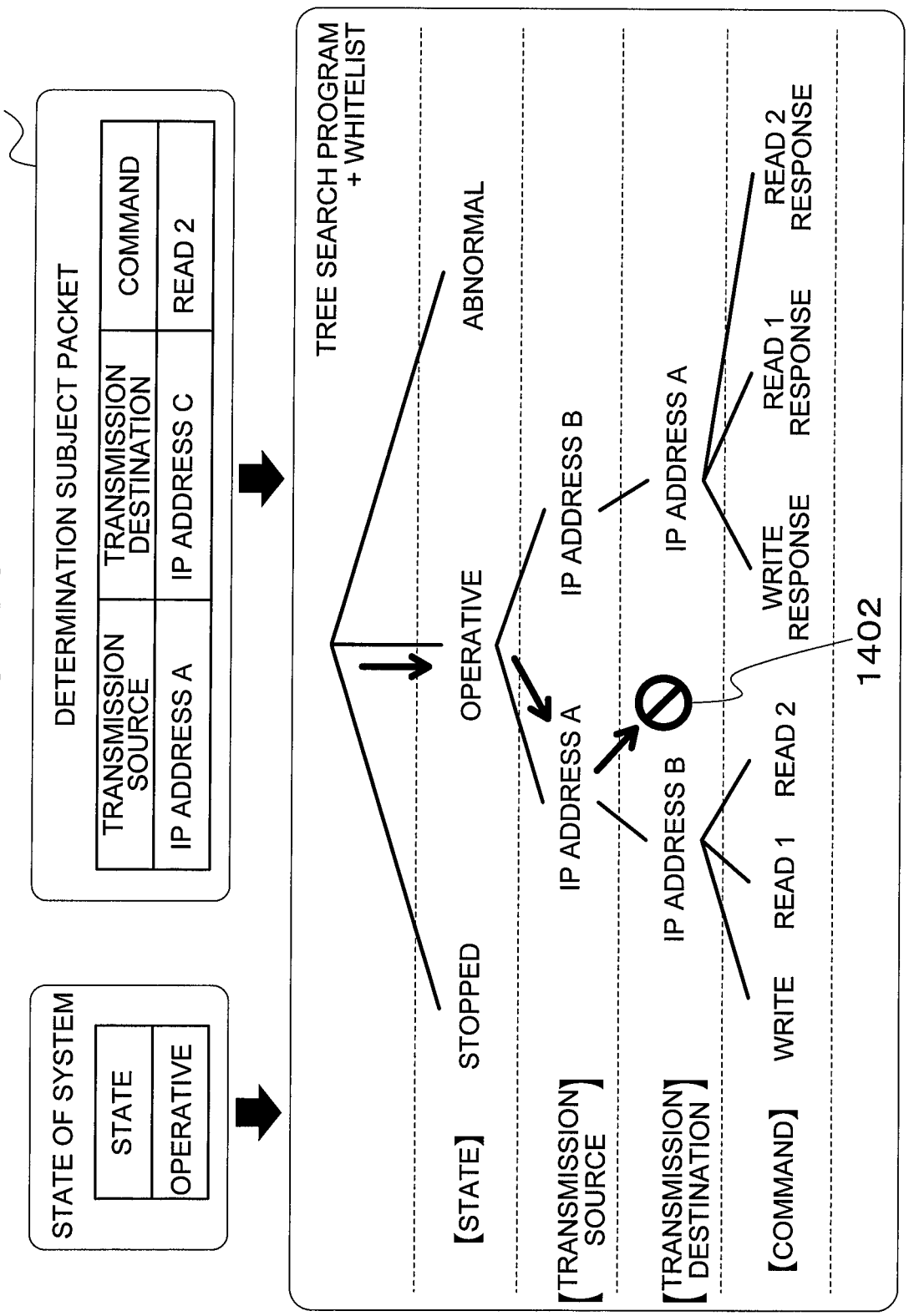
FIG. 14 is another illustrative view showing an operation performed on a determination subject packet by the detection program of the whitelist evaluator according to the third embodiment of this invention.

FIG. 14 is another illustrative view showing an operation performed on a determination subject packet by the detection program of the whitelist evaluator according to the third embodiment of this invention. FIG. 14 shows an operation executed by the detection program on another packet 1401.

In FIG. 14, when a whitelist tree search is performed on the packet 1401, the "Transmission destination" field is "IP address C", and therefore an error 1402 is obtained while searching the "Transmission destination" branch. When the tree search ends in failure in this manner, the packet is refused.

The detection program verification unit 1106 shown in FIG. 11 is used to verify the accuracy of the detection program, but as described above, the detection program is realized by the tree search program, and it is therefore sufficient to verify the accuracy of the tree search program. Moreover, the tree search is a simple algorithm, and therefore the functions to be satisfied by the tree search can be verified easily by applying a static analysis tool incorporating a formal method such as Frama-C to the source code of the tree search program.

Figure 15:
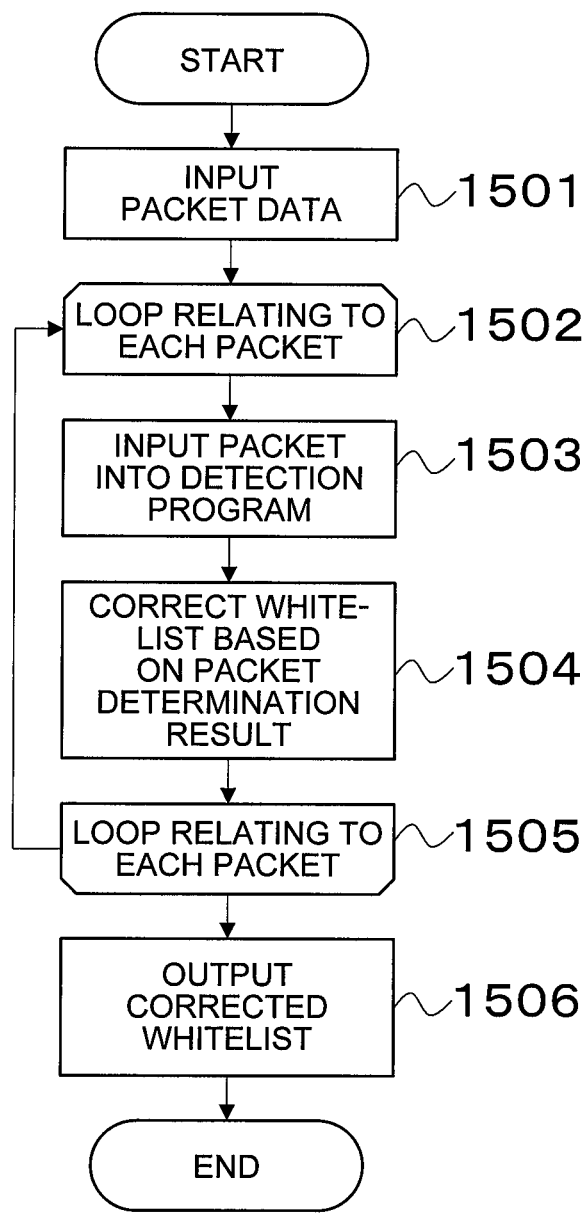
FIG. 15 is a flowchart showing an operation of a whitelist evaluation/improvement unit of the whitelist evaluator according to the third embodiment of this invention.

FIG. 15 is a flowchart showing an operation of a whitelist evaluation/improvement unit of the whitelist evaluator according to the third embodiment of this invention. In FIG. 15, first, packet data are input (step S1501).

Next, loop processing is performed to evaluate a determination result obtained by the detection program in relation to each packet and correct the whitelist as required (steps S1502 to S1505). First, the packet is input into the detection program (step S1503). Next, the whitelist tree is corrected in accordance with the determination result obtained by the detection program in relation to the packet (step S1504).

More specifically, for example, since the determination program is guaranteed to be correct, when a determination result that is expected from the packet is applied as auxiliary input and the determination result obtained by the detection program differs from the expected determination result, an error is determined to have occurred in the whitelist. Accordingly, the whitelist tree is corrected such that the expected determination result is obtained.

Next, following the loop processing of steps S1502 to S1505, the corrected whitelist is output (step S1506), whereupon the processing of FIG. 15 is terminated.

By combining the whitelist with the detection program, the operation of which is guaranteed to be accurate, and correcting the whitelist on the basis of a detection determination result obtained in relation to an actual packet in this manner, more advanced errors such as requirement definition errors that do not appear on the model can be prevented from occurring.

Fourth Embodiment

In a fourth embodiment of this invention, a case in which the second and third embodiments are combined will be described.

First, as described as an effect of the third embodiment, errors in the whitelist caused by requirement definition errors and the like that do not appear at the model level can be corrected by evaluating the whitelist using the accuracy-guaranteed detection program and an actual packet.

By applying the resulting whitelist having further improved accuracy to the whitelist-model conversion operation described in the second embodiment, a more accurate model can be generated.

Hence, by evaluating the whitelist in order to detect errors that do not appear on the model, correcting the whitelist, and then converting the corrected whitelist into a model, the quality of the model can be improved.

REFERENCE SIGNS LIST

201 White list generator
203 Model conversion unit
205 Model verification unit
903 White list conversion unit (first whitelist conversion unit)
1101 White list evaluator
1105 Detection program generation unit
1106 Detection program verification unit
1108 White list conversion unit (second whitelist conversion unit)
1109 White list evaluation/improvement unit
1110 Tree structure conversion unit

The invention claimed is:

1. A whitelist generator applied to a system formed from a plurality of devices, the plurality of devices being configured to exchange data with each other, and generating a whitelist corresponding to a system state in order to use for whitelisting intrusion detection, the whitelist generator comprising:
- a processor; and
- a memory storing instructions which, when executed by the processor, performs a process including
  - receiving a model of the system in which
    - a plurality of control logics are defined, each of the defined control logics being employed by a corresponding one of the plurality of devices, and
    - a plurality of state machines are defined, each of the defined state machines corresponding to a respective one of the plurality of control logics,
  - extracting at least two of the plurality of state machines from the model, each of the extracted state machines defining communication operations of the corresponding control logic employed by the corresponding one of the plurality of devices, each of the extracted state machines including a finite number of states interconnected by transitions, a first subset of the finite number of states representing states of the system, and a second subset of the finite number states representing a series of data exchange states that can be triggered in a corresponding system state of the first subset,
  - by executing a model simulation, or by executing a formal method, namely a mathematical verification of the model, verifying at least one of the following
    - each of the extracted state machines correctly models normal communication in the system; and
    - no logical contradiction exists in each of the extracted state machines, and
  - converting the extracted state machines, having been subjected to said verification, into the whitelist corresponding to the system state, the whitelist being a list of permitted types of packets to be compared against incoming packets in the system to detect an intrusion into the system of a cyberattack while the system is operative.

2. The whitelist generator according to claim 1, wherein the process generates the whitelist from the extracted state machines on the basis of a determined state of the system.

3. The whitelist generator according to claim 1, wherein the process improves at least one of the extracted state machines as required on the basis of a verification result obtained in relation to the at least one of the extracted state machines.

4. The whitelist generator according to claim 2, wherein the process improves at least one of the extracted state machines as required on the basis of a verification result obtained in relation to the at least one of the extracted state machines.

5. The whitelist generator according to claim 1, wherein the process further converts the whitelist into at least one of the extracted state machines.

6. The whitelist generator according to claim 2, wherein the process further converts the whitelist into at least one of the extracted state machines.

7. The whitelist generator according to claim 3, wherein the process further converts the whitelist into at least one of the extracted state machines.

8. The whitelist generator according to claim 4, wherein the process further converts the whitelist into at least one of the extracted state machines.

9. A whitelist generation method applied to a system formed from a plurality of devices, the plurality of devices being configured to exchange data with each other, and generating a whitelist corresponding to a system state in order to use for whitelisting intrusion detection, the whitelist generation method comprising:
- receiving a model of the system in which
  - a plurality of control logics are defined, each of the defined control logics being employed by a corresponding one of the plurality of devices, and
  - a plurality of state machines are defined, each of the defined state machines corresponding to a respective one of the plurality of control logics,
- extracting at least two of the plurality of state machines from the model, each of the extracted state machines defining communication operations of the corresponding control logic employed by the corresponding one of the plurality of devices, each of the extracted state machines including a finite number of states interconnected by transitions, a first subset of the finite number of states representing states of the system, a second subset of the finite number states representing a series of data exchange states that can be triggered in a corresponding system state of the first subset;
- by executing a model simulation, or by executing a formal method, namely a mathematical verification of the model, verifying at least one of the following
  - each of the extracted state machines correctly models normal communication in the system, and
  - no logical contradiction exists in each of the extracted state machines; and
- converting the extracted state machines, having been subjected to said verification, into the whitelist corresponding to the system state, the whitelist being a list of permitted types of packets to be compared against incoming packets in the system to detect an intrusion into the system of a cyberattack while the system is operative.

10. The whitelist generation method according to claim 9, wherein, in converting, the whitelist is generated from the extracted state machines on the basis of a determined state of the system.

11. The whitelist generation method according to claim 9, wherein, in verifying, at least one of the extracted state machines is improved as required on the basis of a verification result obtained in relation to the at least one of the extracted state machines.

12. The whitelist generation method according to claim 10, wherein, in verifying, at least one of the extracted state machines is improved as required on the basis of a verification result obtained in relation to the at least one of the extracted state machines.

13. The whitelist generation method according to claim 9, further comprising converting the whitelist into at least one of the extracted state machines.

14. The whitelist generation method according to claim 10, further comprising converting the whitelist into at least one of the extracted state machines.

15. The whitelist generation method according to claim 11, further comprising converting the whitelist into at least one of the extracted state machines.

16. The whitelist generation method according to claim 12, further comprising converting the whitelist into at least one of the extracted state machines.

* * * * *